United States Patent [19]

Anderson

[11] Patent Number: 4,457,265
[45] Date of Patent: Jul. 3, 1984

[54] SELF-LATCHING STANCHION AND SYSTEM FOR CATTLE AND THE LIKE

[76] Inventor: Bernard O. Anderson, 5341 Banff La., Glendale, Ariz. 85301

[21] Appl. No.: 419,997

[22] Filed: Sep. 20, 1982

Related U.S. Application Data

[63] Continuation-in-part of Ser. No. 313,133, Oct. 20, 1981, abandoned.

[51] Int. Cl.³ .............................................. A01K 1/06
[52] U.S. Cl. ............................... 119/148; 119/147 R
[58] Field of Search .............. 119/147 R, 147 A, 148, 119/149, 150

[56] References Cited

U.S. PATENT DOCUMENTS

| | | | |
|---|---|---|---|
| 737,884 | 9/1903 | Thompson | 119/148 |
| 1,464,159 | 8/1923 | Troth | 119/148 |
| 3,863,604 | 2/1975 | Nielsen et al. | 119/148 |
| 4,037,566 | 7/1977 | Albers | 119/148 |
| 4,051,813 | 10/1977 | Albers | 119/148 |
| 4,185,592 | 1/1980 | Albers, Sr. | 119/148 |
| 4,314,528 | 2/1982 | Fogleman | 119/148 |

Primary Examiner—Gene Mancene
Assistant Examiner—Kris R. Schulze
Attorney, Agent, or Firm—Cates & Roediger

[57] ABSTRACT

A latching, releasing and locking stanchion apparatus for cows and the like includes reciprocating operating bars and latching/release mechanism operated by the bars wherein the latching/release mechanism is supported completely independently of the operating bars and independently of the stanchion members. Relatively thin section materials are bent into the shapes desired and welded together to form an upper support structure having rigidity and strength while retaining light weight. Fixed, release and bracing stanchions are provided and are, appropriately, welded to a lower support at their bottom and the upper support at their top. The support structure is channel shaped and holds within itself the latching and release mechanism while the operating bars are carried externally to the channel. Self-catch, single release, delayed release, group release, lock-in, lock-out and non-catch features are provided. Manual release mechanism permits the removal of a stanchion member in an emergency situation.

18 Claims, 13 Drawing Figures fig.1 fig.2a fig.2 fig. 4 fig. 3 fig.5 fig.6 fig.7 fig. 11 fig. 12

SELF-LATCHING STANCHION AND SYSTEM FOR CATTLE AND THE LIKE

This application is a continuation-in-part of application Ser. No. 06/313,133, filed Oct. 20, 1981, now abandoned, entitled Self-Latching Stanchion and System For Cattle and The Like by the same inventor.

BACKGROUND OF THE INVENTION

This invention relates to a latching and release system for cattle stanchions or the like, more particularly to such stanchions that are self-latching, self, or group, releasing and/or locking in either open or closed position and it is an object of the invention to provide an improved system and/or apparatus of this nature.

Cattle stanchions for holding and releasing cattle, cows for example, during milking, feeding and/or veterinarily treating are well-known and exist in many varieties. An essential feature of these devices and/or their systems has been and remains to be apparatus that is strong, lightweight, positive and foolproof in operation and relatively easy to maintain. It is also essential that these stanchion arrangements enable the cattle to come in and latch themselves into place and thereafter enable the operator to release the cattle individually or as a group.

For devices of this nature, reference may be made to the prior patents Albers U.S. Pat. No. 4,185,592 and Albers U.S. Pat. No. 4,037,566. In each of these patents there is disclosed a cattle stanchion arrangement involving a fixed stanchion and a release stanchion which includes latching or locking mechanism carried on its upper end. Locating a substantial part of the latching and/or locking apparatus on the top of the release stanchion interrelates the operation of the release stanchion and the mechanism for operating the latching mechanism thereby weakening the structure and enabling malfunctions to occur during utilization.

It is a further object of the invention, accordingly, to provide an improved self-catch or latch stanchion of the character indicated in which the opening and closing operating mechanism is independent of the latch-/release mechanism.

Moreover, the exact location of the latch/release keys may be accurately die stamped in the top horizontal member of the all-welded stanchion frame. Accordingly in operation the latch/release keys and the release stanchion member have a permanently established relationship. This feature is lacking in the self-latching stanchions available to the art such as those of the patents referred to. That is to say, the self-latching stanchion as at present employ a system in which the latch-release mechanism and the operator bar therefor are fully interdependent.

Manual release mechanism is provided so that a cow may be released under the circumstances where the cow has fallen and jammed the regular release apparatus.

SUMMARY OF THE INVENTION

Accordingly it is a further object of the invention to provide an improved latching and release system for cattle stanchions which overcomes the defects of the prior art.

In carrying out the invention according to one form there is provided a latching and release system for cattle stanchions comprising a fixed stanchion, first means for supporting the fixed stanchions at its upper end, second means for supporting the fixed stanchion at its lower end, a release stanchion located adjacent the fixed stanchion to define a head opening for an animal, the release stanchion having an upper portion and a lower portion for actuating the release stanchion, the upper portion being adapted to be latched, mounting means attached at least to the first means mounting the release stanchion for pivotal movement between open and closed positions, the upper portion in the open position being pivoted away from the fixed stanchion to enlarge the upper part of the head opening and thereby enabling an animal to place its head through the head opening, the lower portion in the open position being located in the head opening for engagement by the neck of an animal with its head in the upper part of the head opening, the upper portion in the closed position being pivoted toward the fixed stanchion to narrow the upper part of the head opening, the lower portion being operative to pivot the release stanchion to the closed position upon movement of the animal's neck against the lower portion and into the lower part of the head opening; latching means attached to the first means for releasably engaging the upper end of the upper portion of the release stanchion in a closed position, actuating means attached to the first means for actuating the latching means to a release position for enabling release of the release stanchion, and operating mechanism movable relative to the first means for operating the actuating means between latching and release positions of the latching means.

In carrying out the invention according to another form there is provided an improved, latching and release system for cattle stanchions comprising a fixed stanchion having an upper end and a lower end, a release stanchion located adjacent the fixed stanchion to define a head opening for an animal, U-shaped means having two sides for receiving the upper end of the fixed stanchion between the two sides and for supporting same, second means for supporting the lower end of the fixed stanchion, the release stanchion having an upper portion and a lower portion for actuating the release stanchion, the upper portion being adapted to be latched, mounting means having a lower end attached to the second means and having an upper end received between the two sides and attached to the first means mounting the release stanchion for pivotal movement between open and closed positions, the upper portion in the open position being pivoted away from the fixed stanchion to enlarge the upper part of the head opening and thereby enable an animal to place its head through the head opening, the lower portion in the open position being located in the head opening for engagement by the neck of an animal with its head in the upper part of the head opening, the upper portion in the closed position being pivoted toward said fixed stanchion to narrow the upper part of the head opening, the lower portion being operative to pivot the release stanchion to the closed position upon movement by the animal's neck against the lower portion and into the lower part of the head opening latching means comprising a first pin extending between the two sides of the U-shaped means for releasably engaging the upper end of the upper portion of the release stanchion in a closed position actuating means means disposed between the two sides of the U-shaped means for actuating the latching means to a release position for enabling release of the release stanchion, and operating mechanism carried by the U-shaped means and being movable relative thereto for operating the actuating means between latching and release positions.

Further, in the latching and release system as described the U-shaped means includes first arcuate slots and pivot openings in each of its two sides, and the latching means comprises a U-shaped member having two connected legs one of which is pivotally mounted in the pivot openings and extends between the two sides of the U-shaped means and the other of which extends between the two sides in the first arcuate slots and is movable downwardly under the force of gravity to a releasable stanchion latching position and upwardly to a release position.

Still further, in the latching and release system as described the U-shaped means includes second arcuate slots in each of its two sides, the actuating means comprises an arm having an upper end attached to the pivot leg of the U-shaped member and a depending lower end having two ends projecting through the second arcuate slots for engagement by the operating member, and the operating mechanism comprises reciprocating members movable alongside the two sides and each includes an elongated slot for receiving one of the two projecting ends of the U-shaped member, the elongated slots having ends and dimensions for one end of the slots to engage the projecting ends for urging the other leg of the latching means to a non-release position of the latching means and for the other end of the slots to engage the projecting ends for urging the other leg of the latching means to a hold open position of the latching means.

DESCRIPTION OF THE DRAWINGS

For a better understanding of the invention, reference should now be had to the accompanying drawings in which.

DESCRIPTION OF THE PREFERRED EMBODIMENT

Referring to the drawings, stanchion apparatus 20 is disclosed including three stanchion sections 21 each for an individual animal, cows for example. Three sections are of course exemplary as many more, or fewer, may be embodied in the apparatus, for example, up to and including 100. The stanchion apparatus 20 includes a base member 22 and an upper member or super structure 23 which includes the latching, releasing and operating mechanism and/or system as will be described.

Each individual stanchion section includes a fixed stanchion member 24, a release stanchion member 25, a stanchion pivot member 26 and bracing stanchion members 27 and 28. The individual stanchion sections 21 may be spaced as far apart as is necessary or desired, for example about thirty inches in one typical case between the fixed stanchion 29 and the bracing stanchion member 28. It will be understood that all of the stanchion sections 21 will have the bracing and release stanchion members as described for the particular stanchion section. Only one stanchion section 21 will be specifically described.

The fixed and bracing stanchion members are attached to the base member 22 in any well known manner, such for example as by welding, the base member 22 being attached to any floor such as a concrete floor, for example. The upper ends of the fixed and bracing stanchion members are attached to the upper structural member or super structure 23 in any well known manner such as by welding, as will be more particularly described.

Figure 1:
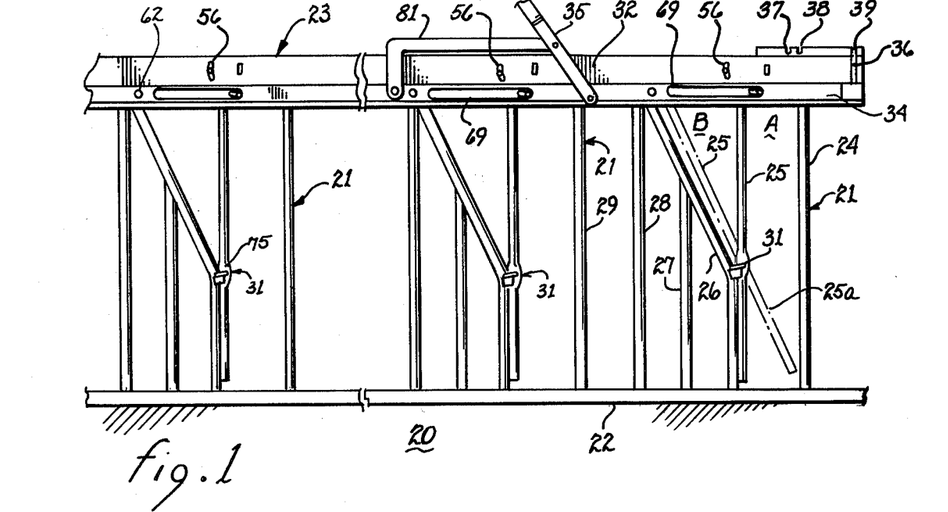
FIG. 1 is an elevational view of a latching and release stanchion and system according to the invention.

The release stanchion member 25 has two positions, a closed position as shown by the vertical solid lines in FIG. 1 and an open position as shown by the dot-dash lines in FIG. 1. In the vertical or closed position of release stanchion member 25, the space between stanchion members 24 and 25 defines the space A within which a cow's neck is disposed when the animal is locked into position. When the release stanchion 25 is in the angular or slanted position, as shown by the dot-dash lines, the space A becomes enlarged to include the space B so that the cow can remove its head.

Under various conditions it is intended that a cow may come into the barn with the release stanchions 25 in the open position so that a cow may dispose its head in the space A plus B and in undergoing the process of feeding the cow's neck will come into contact with a lower portion 25a and cause the release stanchion 25 to pivot clockwise about the pivot 31 to the vertical position. After reaching this position the release stanchion 25 is latched into place and the cow held with its head on the far side of the stanchion members. As will be described hereinafter, the operating apparatus will release the release stanchion 25 and under the influence of gravity the stanchion member will pivot counterclockwise to the position shown in dot-dash lines in FIG. 1 whereby the cow may remove its head and move out of the barn. The latching, releasing and locking mechanism to be subsequently described will function to not only enable the cow to move its head into the provided space to become latched into position, to be individually released, to be released as a group, and to be locked in or out. Further if a particular cow is jamming the associated released stanchion so that it will not release when desired all other cows can nevertheless be released and the particular cow will become released whenever she chooses to move her head into a relaxed or non-tension producing position.

The super structure 23 includes a channel member 32, a pair of longitudinally reciprocable operating bars 33 and 34, an operating handle 35 and a locking stirrup or clevis 36. The locking stirrup 36 cooperates with three sets of slots, 37, 38 and 39 formed in a holding member 41 attached to the upper surface of the channel 32 and holes 42 in the ends of the operating bars 33 and 34.

A latching member 43 and an actuating member 44 are supported interiorly of the channel member 32 and are operated into three positions by movement of the handle 35 to achieve the operating positions and advantages of the invention as will be described. The stirrup or clevis like member 36 when received in one of the series of slots 37, 38 and 39 and the holes 42 serves to lock the operating bars 33 and 34 into fixed positions with respect to the channel member 32.

Figures 2, 2A:
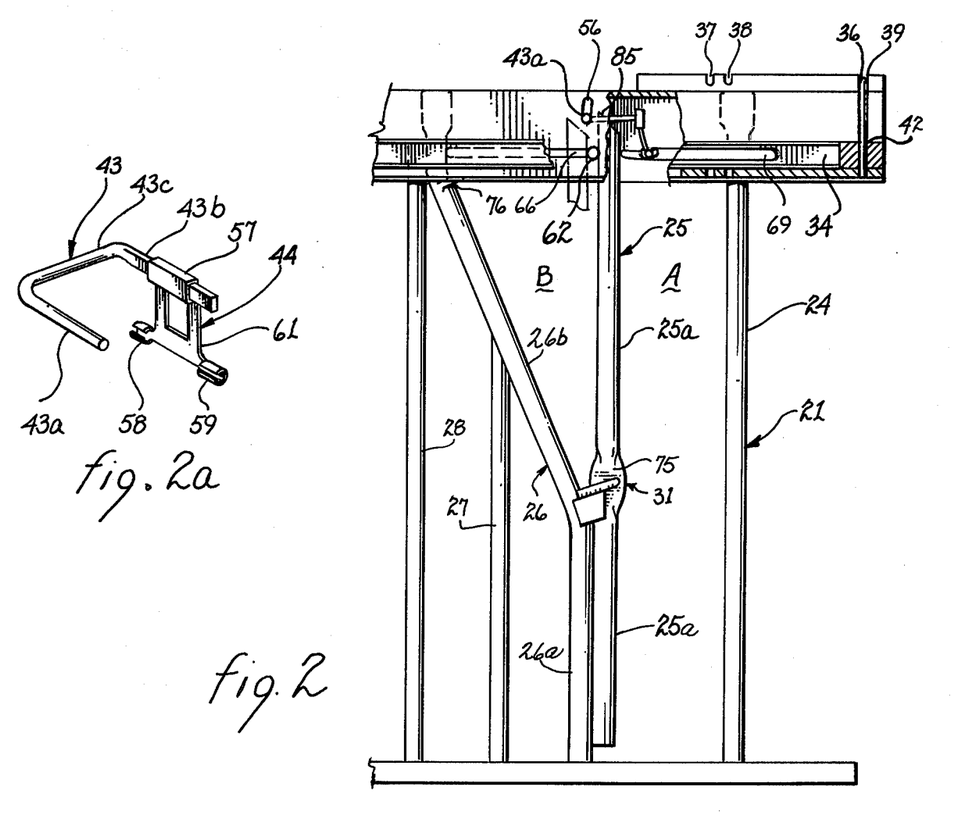
FIG. 2 is a fragmentary view of the apparatus and system shown in FIG. 1 on an enlarged scale.
FIG. 2a is a perspective view of an operating part of the apparatus and system illustrated in the preceding figures.
Figure 3:
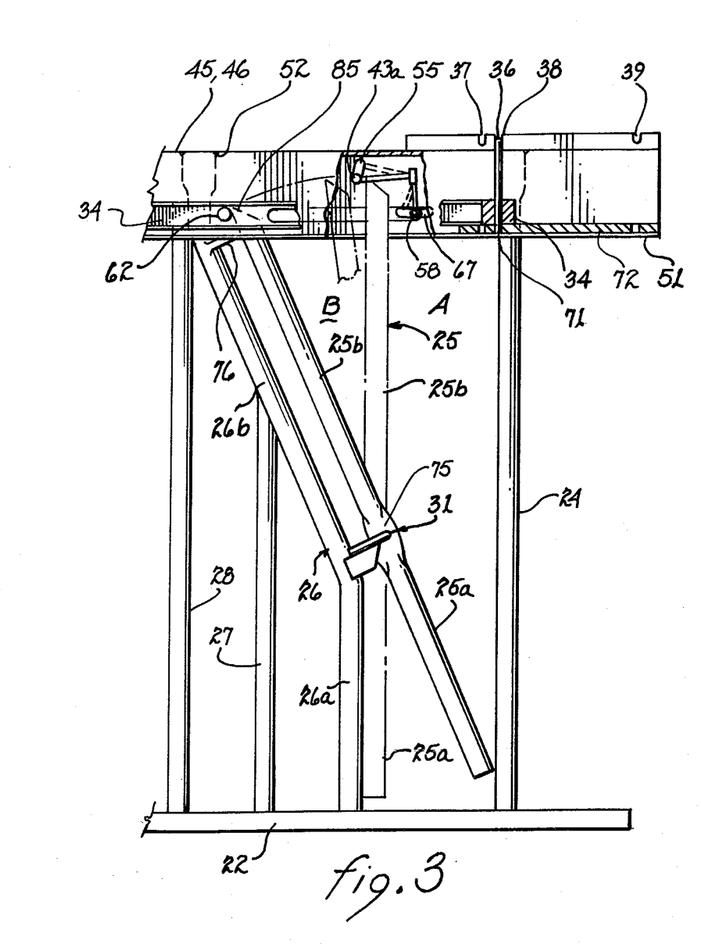
FIG. 3 is a view similar to FIG. 2 showing the apparatus in a further operating position.
Figure 4:
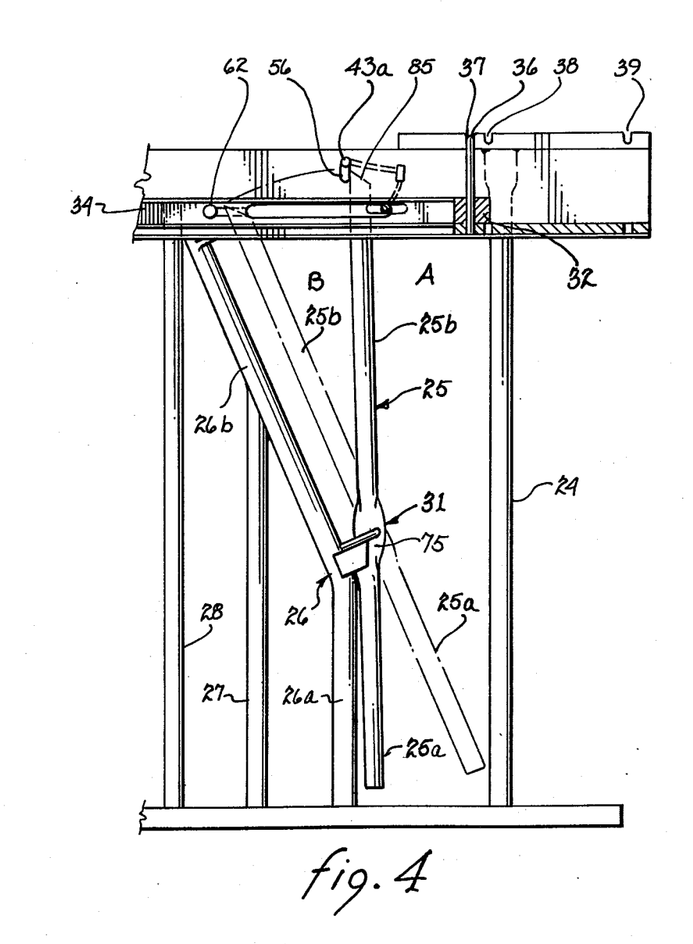
FIG. 4 is a view similar to FIGS. 2 and 3 showing the apparatus in a still further operating position.

The slots 37, 38 and 39 define three different operating positions of the handle 35, the operating bars 33 and 34 and the latching member 43 as determined by the clevis member 36 being received in one of the series of slots 37, 38 and 39 and the holes 42 in the operating bars (FIGS. 4, 3 and 2 respectively).

In the position as may be observed in FIG. 2 the clevis member 36 is in the slots series 39 and the holes 42 when the operating bars are in their extreme right most position. In this position, the release stanchion 25 is positively locked in its right hand position thereby defining the space A in its narrow aspect. If a cow's neck is in the space A under this condition the cow cannot remove its head from the space. This is a lock in position. And in this position the animal may have blood drawn or any other test conducted upon it without the animal being able to move out. If the release stanchion 25 is in the position of FIG. 2 before the cow has disposed its head into space A the cow cannot put its head into the space A. In other words, it is lock out position too. In this condition feed may be disposed in the feed bin and the like. The operation of the latching mechanism 43 for this condition and the two other conditions, will be made clear in subsequent description.

In another position of the structure, as observed in FIG. 3, the operating bars are moved forward, that is toward the left and until the clevis mechanism 36 is received in the slot series 38 and the holes 42. The latch mechanism 43 and the actuating member 44 are in a position such that if the release stanchion is in the open position a cow may dispose its head into the space A and by lowering its head cause its neck to engage the portion 25A whereupon the release stanchion 25 pivots toward the right and becomes engaged by the latch member 43. Thereafter the cow is latched into position. All cows may of course go through this operation. In this position of the latching mechanism the individual latches may be manually operated and a particular cow released if desired.

Figures 8, 9, 10:
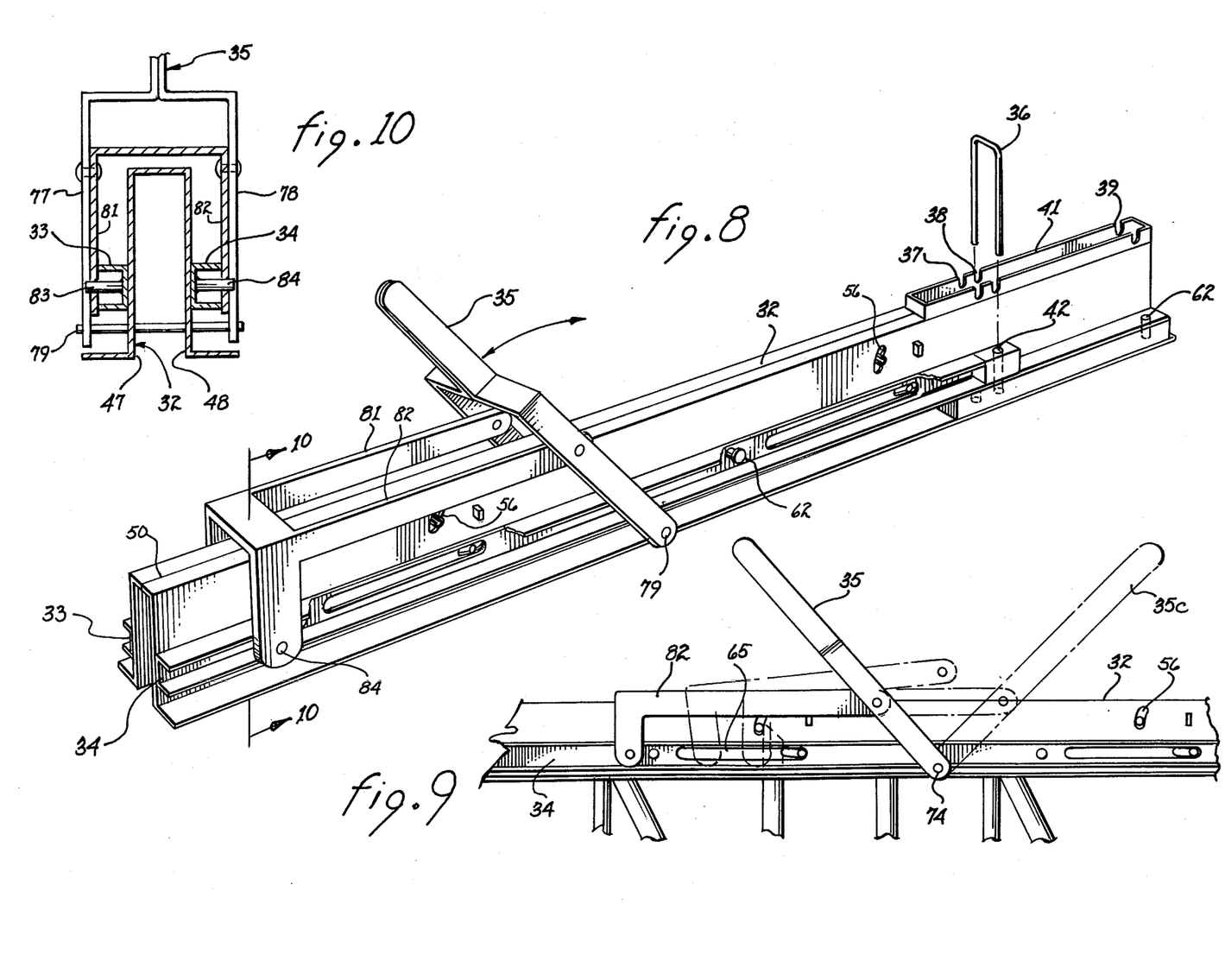
FIG. 8 is a fragmentary view, in perspective, of another operating component of the invention.
FIG. 9 is a fragmentary elevational view of the apparatus shown in FIG. 8.
FIG. 10 is a sectional view taken substantially in the direction of the arrows 10—10 of FIG. 8.

When it is desired that all cows are to be released as a group, the operating handle 35 as shown in FIGS. 1 and 8 is moved to a further position, the extreme left of FIG. 4, thus moving the operating bars 33 and 34 toward the extreme left whereby the clevis member 36 is receivable in the slot series 37 and the holes 42. In this position the latch member 43 and the actuating member 44 are in a position where the latch member is completely released and the release stanchion 25 is free to pivot to the position shown in the dot-dash lines solid lines of FIG. 4. In this position, if a cow should dispose its head through space A and lower her neck to cause the stanchion to pivot toward the right, the release stanchion 25 would not be engaged by the latch, and when the cow raised its head again the release stanchion would pivot toward the left as shown dot-dash in FIG. 4. Other features and advantages of the latching mechanism in the various positions of FIGS. 2, 3 and 4 will be described subsequently in this specification. In addition to the latching provided by the latch mechanism 43, utilizing the clevis or stirrup member 36, also locks the operating bars to the channel member 32 for additional holding of the operating mechanism locked together.

Figure 5:
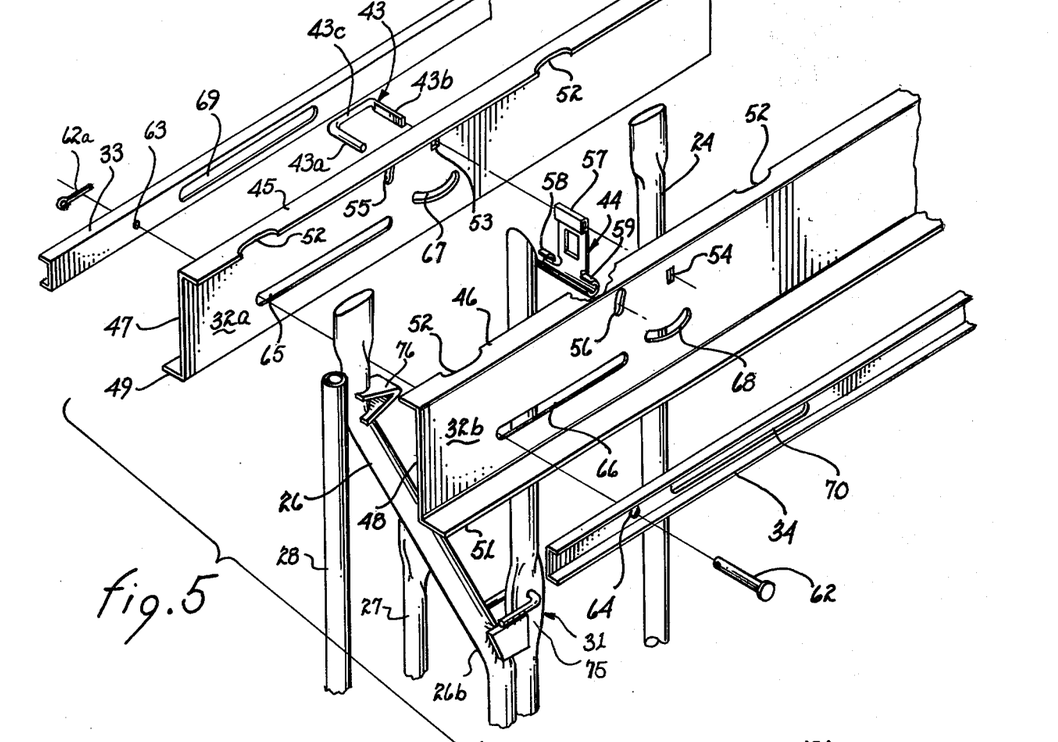
FIG. 5 is a fragmentary exploded view, in perspective, illustrating the various components of the inventive system and apparatus.
Figure 6:
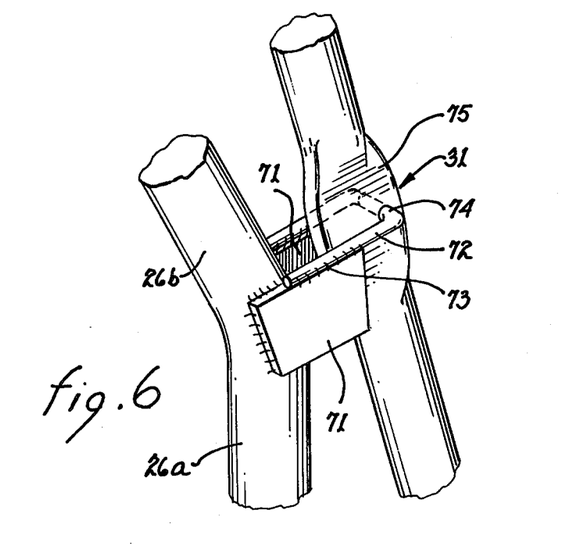
FIG. 6 is a fragmentary view, in perspective, on a larger scale in perspective of a portion of the apparatus.

Referring to FIG. 5, the arrangement of the various parts and their operating functions may be described in the exploded view. Thus the channel member 32 may be formed of two angle members 32a and 32b having upper flanges 45 and 46, respectively, web members 47 and 48, respectively, and lower flanges 49 and 51, respectively, the lower flanges 49 and 51 serving to provide stiffness and strength. The angle members 32a and 32b may be formed by bending sheet material of appropriate thickness to provide the flanges 45, 46 and 49 and 51. Lightweight and strength are achieved in this manner. The channel member 32 is achieved by disposing the edges of the flanges 45 and 46 together and providing either a continuous seam welding 50 or spot welding at any appropriate points needed. Semi-oval slots 52 may be provided in each of the flanges 45 and 46 and when the flanges are disposed together, oval openings are provided into which are received the upper ends of the fixed stanchions 24 and the upper end of bracing stanchion 26. All other stanchion members 24, 28 and 29 for example as shown in FIG. 1 would be attached by welding into the upper ends thereof into appropriate oval or circular slots in the upper flanges 45 and 46 of the channel member 32. It may be visualized that when the upper flanges 45 and 46 are welded together as described and the upper ends of the various stanchions are welded into the oval or circular slots 52 the resulting structure becomes very strong and rigid while remaining lightweight because the material forming the channel member may be relatively thin under this form of construction.

The latching member 43 is U-shaped and includes a yoke 43a, a shank 43b and a connecting link 43c. The shank 43b of latching member 43 is rectangular in cross section and is received in rectangular holes 53 and 54 in webs 47 and 48, respectively, and as may be seen in greater detail in FIG. 7. The latch yoke 43a of latching member 43 is received through arcuate slots 55 and 56 in the webs 47 and 48 respectively. The dimensions of the rectangular shank 43b are slightly smaller than the rectangular slots 53 and 54 so that the shank 43b can pivot clockwise and counterclockwise in the slots 53 and 54. Accordingly, in so pivoting the yoke 43a will move clockwise or counterclockwise in the arcuate slots 55 and 56 for purposes that will become clear subsequently.

The actuating member 44 is disposed between the webs 47 and 48 within the channel 32 and may be made of spring steel, for example, to give it a relatively high stiffness as well as strength for performing its function. The actuating member includes a base 57 which may be square in cross section to be received around the shank 43b, projecting members 58 and 59 and a resilient but stiff web 61 connecting the base 57 and the projecting members 58 and 59. Referring to FIG. 2a it will be clear that if the projecting members 58 and 59 are moved, which is to say pivoted, either counterclockwise or clockwise, the base 57 will cause the shank 43b to pivot likewise thereby causing the yoke 43a to rotate clockwise or counterclockwise in the arcuate slots 55 and 56.

The operating bars 33 and 34 are channel members disposed along side the webs 47 and 48, respectively, and are held in this position by pins 62 disposed at appropriate intervals, as will be understood, along the extent of channel 32 and projecting through holes 63 and 64 respectively in the operating bars 33 and 34 and projecting through elongated slots 65 and 66 in webs 47 and 48, respectively. The pins 62 in addition to holding the operating bars 33 and 34 to the channel 32 assist in holding the release stanchion in one of its operative positions, as will become clear. Pins 62 may be terminated in the usual manner by cotter pins 62a as is well known. When the actuating member 44 is disposed between the flanges 47 and 48 in the assembled structure as may be visualized, the projecting members 58 and 59 extend into arcuate slots 67 and 68 respectively, formed in the webs 47 and 48 respectively. Additionally, the projecting members 58 and 59 project into the elongated slots 69 and 70 formed in the operating bars 33 and 34, respectively. Thus, as may be visualized in the movements of the operating bars reciprocatingly toward the left and toward the right one edge of the slots 69 and 70 will bear against the projecting members 58 and 59 causing the actuating member 44 to move clockwise thereby pivoting the yoke member 43a of the latching member clockwise. In the opposite position, the other ends of the slots 69 and 70 will bear against the projecting members 58 and 59 thereby causing the actuating member 44 to pivot counterclockwise and consequently the yoke member 43a to pivot counterclockwise. The slots 69 and 70 are wide enough to accommodate the arcuate movement of projecting members 58 and 59. Referring briefly, to FIG. 1 and considering this figure in connection with FIG. 5 it will be understood that a series of the pins 62 are disposed in the structure, one in association with each of the stanchion sections 21.

The release stanchion 25 consists of two parts, or legs, 25a and 25b and is pivoted to the pivot stanchion 26 at the pivot 31. As shown, the pivot stanchion 26 includes a lower portion, or leg 26a and an upper portion, or leg 26b, the lower leg 26a being attached, as by welding, to the base member and the upper leg being attached, as by welding, to the top portion 45, 46 of the channel 32, as by welding at 52. The upper leg 26b of a pivot stanchion 26 is at an angle to the lower leg 25a so as to form a knee at the pivot area 31 The angularity of the upper leg 26b is such that when the upper leg 25b of the release stanchion 25 is disposed parallel to the leg 26b, the space A and B together form a sufficiently large space for a cow, for example, to dispose her head through the opening. This constitutes the open position of the release stanchion. The pivot 31 comprises a pair of parallel plates 71 welded on each side to the knee between pivot stanchion members 26a and 26b and a U-shaped clevis member 72 welded at 73 along each of its legs to the parallel plates 71. The link 74 between the legs of the U-shaped clevis 72 actually forms the pivot with a hole through a flattened portion 75 between the upper and lower portions 25b and 25a. The flattened portion 75 enables the pivot to be formed as shown without enlarging the space between the two parallel plates 71. The location of the hole for the link 74 is offset toward the right from the center line of the release stanchion 25. The release stanchion is thus heavier on the left hand side and will pivot to the open position whenever the stanchion is not latched. The cow does not need to nudge the arm 25b toward the open position. The stanchion flaps open on its own.

When the release stanchion is in its vertical position, the lower leg 25a is disposed parallel to the lower leg 26b of the pivot stanchion and when the release stanchion 25 is in its open position the upper leg 25b is disposed parallel to the upper leg 26b of the pivot stanchion. The location of the pivot 31 in the release stanchion 25 and the corresponding knee portion of the pivot stanchion 26 are such that the upper leg 25b is substantially heavier than the lower leg 25a. Thus, in the ordinary event, the upper leg 25b because of its weight predominates and lies disposed in the angular position as shown in FIG. 3 to provide the open space A plus B. Because of this top heaviness and even though the release stanchion may be in its vertical position as shown dot-dash in FIG. 3 the slightest movement against the upper leg of 25b causes the release stanchion to pivot to the position shown in solid lines thereby opening the stanchion for an animal to insert its head. At the same time the pivot 31 is at such a point that the effort required to pivot the release stanchion 25 from the slanted position to the vertical position is small. Thus when a cow disposes its head into the space A plus B and lowers its head so that its neck comes into contact with the leg 25a such a force causes the release stanchion 25 to pivot clockwise from the slanted to the vertical position as will become clear.

For moving the operating bars 33 and 34 into the various operating positions relative to the channel member 22 the handle 35 is provided. The handle 35 may include two parts, 77 and 78, pivoted at their lower ends by means of a pin 79 to the webs (or sides) 47 and 48 of the channel member 32. As may be seen best in FIG. 10, each of the parts 77 and 78 may be pivoted to L-shaped links 81 and 82, respectively, the other ends of which are pivoted by means of pins 83 and 84, respectively, to the interior webs or walls of the operating bars 33 and 34, respectively.

With this description of the operating handle 35 in mind and referring to FIGS. 8, 9 and 10, the operation of the handle 35 and the operating bars may be understood. Thus when the arm 35 is moved to its extreme left hand or counterclockwise position, it will be evident that the operating bars 33 and 34 are moved by means of L-shaped links 81 and 82 to their left most position. In this position the clevis member 36 would be positionable in the slot series 37 and in the holes 42 in the ends of the operating arms 33 and 34. A relatively slight movement of operating arm 35 toward the right clockwise and the operating bars 33 and 34 will be moved to the right to the position where the clevis member 36 would be positionable in the slot series 38. Further movement of the operating handle 35 toward the right as shown by the position 35c in FIG. 9 the operating bars 33 and 34 will be moved to their right most position at which point the clevis member 36 will be positionable in the slot series 39. The slot series 37, 38 and 39 define the three operating positions of stanchion apparatus.

With the structure as thus far described in mind further structure may be described and the operation understood by referring to the various individual operation positions of the apparatus as illustrated in FIGS. 2, 3, and 4.

Three operating positions (1, 2, 3) are considered and are exemplified, respectively, in FIGS. 3, 4 and 2.

Position 1 (FIG. 3) is considered first in explaining the sequence of operation as a matter of convenience and simplicity in understanding the operation, and may be referred to as the self-catch and single release position. In this position, it may be considered that the release stanchion 25 is in the open position, that is the upper leg 25b is disposed toward the left and is resting against the spacer 76. The spaces A and B are both available for a cow to put her head through after she has come into the stanchion area. This is the position of the apparatus when the feed has been disposed in the feed bin and it is expected that the cows will come in and place their heads through the combined openings A and B, begin feeding and be in position for milking. As described, when a cow has disposed her head through openings A and B and lowered her head to feed, her neck comes into contact with leg 25a and causes the release stanchion 25 to pivot from the position shown solid in this figure to the position shown dot-dash, that is to say to the vertical. In this position the upper end 25b of the release stanchion is caught behind the yoke 43a of the latching member 43, thus holding the release stanchion 25 in its vertical position. The cow under these circumstances cannot remove her head because the release stanchion 25 cannot pivot away against the holding or latching influence of the yoke 43a bearing against the rearward side of the release stanchion.

Figure 7:
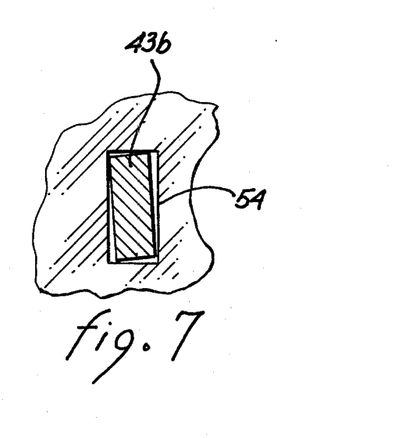
FIG. 7 is a fragmentary sectional view of one of the operating components of the invention.

The very upper end of the leg 25b has an angle surface 85. As the leg 25b pivots clockwise under the influence of the cows neck against the leg 25a, the angle surface 85 comes against the yoke 43a and causes it and the latching member 43 to pivot clockwise about the pivotal opening 54 (FIG. 7). As the yoke 43a moves upwardly the end of the leg 25b including the angle surface 85 slides underneath it and when it has moved beyond it, as in the full vertical position shown dot-dash in FIG. 3, the yoke 43a falls under the influence of gravity behind the very upper end of the leg 25b of the release stanchion. The pivoting movements of the latching member 43 about the pivot opening 54, of course, causes the projection 58 and 59 to swing in the arcuate grooves 66 and 67 provided for that purpose.

In this position of the release stanchion and the latching mechanism 43 individual cows can be released by an attendant coming along and grasping the connection portion 43c of the latching member 43 and rotating it clockwise so that the upper portion 25b of the release stanchion can rotate counterclockwise to give openings A and B. In this attitude, as indicated the cow can remove its head. The latching member 43 in a particular stanchion section can be moved upwardly to release an individual cow even though the operating bars are locked into position by the clevis member 36. This is feasible, in part, because the latching member 43 and the actuating member 44 are disposed in the channel section 32 and are independent, totally, of the operating mechanism (bars 33 and 34, etc.) in this location.

When the upper leg 25b of the release stanchion is in the left most position shown in solid lines in FIG. 3, there is a space between the leg 25b and the leg 26b as determined by the dimensions of the link 72, 74 and the dimensions of the spacer 76. It is significant that the space exists because if the animal should have its ear in this space and if the leg 25b were permitted to lie directly against the member 25b the animal's ear could be caught and in trying to remove its head the ear could be injured.

The link 72, 74 including the U-shaped member may be formed from a single bar of metal and bent into the configuration shown. One leg of the U-shaped member may be disposed through the opening in the flattened part 75 of the release stanchion. Because of the flattened part 75, the legs of the U-shaped member can be relatively easily disposed through the opening and thereafter, the legs 73 welded to the parallel plate 71 and 72 to form a very strong and easily formed structure.

From position 1 as shown in FIG. 3 the release stanchion may move or be moved into position 2 of FIG. 4 or position 3 of FIG. 2. Position 2 of FIG. 4 may be referred to as the single movement total release, delayed release and non-catch position of the release stanchion, and position 3 of FIG. 2 may be referred to as the positive lockin and lockout position of the release stanchion.

From position 1, FIG. 3, in addition to the individual release of any one cow by manual actuation of the latching member 43, the operating bars 33 and 34 may be moved toward the left by lifting out the clevis 36 and moving the operating handle 35 toward the left. This will be a movement toward the non-catch position no. 2 of FIG. 4.

Thus referring to FIG. 4 the operating bars 33 and 34 are shown in their left most position with the clevis 36 in the slot series 37. In this position, the right most end of the slots 68 and 69 engage the projections 58 and 59 of the actuating member 44 causing them to pivot in the arcuate slots 66 and 67 to their left most position.

Ordinarily this would cause the yoke 43a to pivot upwardly in the arcuate slots 55 and 56 thus moving the yoke 43a out of the way of the upper end 85 of the leg 25b of the release stanchion. If the yoke 43a moves upwardly as described it will move out of the way of the release stanchion as indicated and the release stanchion under the influence of gravity will pivot counterclockwise so that the release stanchion will take the position shown in the dot-dash lines of FIG. 4.

If, however, a cow is trying to pull her head out of the space A+B and is therefore exerting pressure against the leg 25b of the release stanchion 25 the yoke 43a will not move out of the way and the stanchion 25 will remain vertical. The spring member 61 of the actuating member 44 deflects under these circumstances. However, as soon as the cow releases the tension or force against the leg 25b such as by the cow moving her head forward slightly, the spring member 61 causes the latching member 43 to pivot upwardly thereby moving the yoke member 43a out of the way of the very upper end of the leg 25b of the release stanchion and the release stanchion pivots counterclockwise under the influence of gravity and the cow can remove its head from the spaces A+B. This is the delayed release feature.

With the operating bars 33 and 34 in their left most position as shown in FIG. 4 the yoke member 43a stays in the upper most position as seen in this figure and thus the release stanchion 25 cannot have its upper portion caught in the vertical position. That is to say, this is the non-catch position in which the operation is not concerned about the cow coming in and putting her head into the space A+B and actuating the release stanchion to the vertical position by lowering her neck against the leg 25a. Even though the cow does this as soon as she moves her head upwardly the release stanchion 25 pivots to its counterclockwise position and the cow can move outwardly. Position 2, shown in solid lines in FIG. 4 is the delayed release or hang-up position and flowing from the consequences thereof to the dot-dash showing in FIG. 4 is the non-catch position. That is after the cows have been released by operation of the operating bars 33 and 34 to the left most positions so that all cows can be released and any hangerson are released as soon as they relax the force against the release stanchion, as indicated, cows can come in and pivot the release stanchion to a vertical position but it will immediately fall back to the angular position shown when the cow is not held in place. Thus, in FIG. 4 there is illustrated a single movement total release of all the cows, a delayed release in the event one or more cows hang up the mechanism and a non-catch position after all of the release stanchions have been in fact released.

In position 3 as illustrated in FIG. 2 the operating handle 35 is moved to its right most position and the operating bars 33 and 34 are moved to their right most position so that the clevis 36 is received in the slot series 39. In this position, the left most end of the slots 68 and 69 bear against the projections 58 and 59 and cause the spring arm 61 of the actuating member 44 to be pivoted counterclockwise to its right most position. In this position the yoke 43a is biased downwardly and held in its downward position by the influence of the spring member 61 as described. The upper leg 25a of the release stanchion is held in its vertical position. This position would ordinarily be taken only when the cows already have their heads in the spaces A+B, as for example during the milking or feeding operation. And when the milking operation is going on or is completed, and the same for the feeding operation, the release stanchions are not released because the yoke member 43a as is held in its downward position. At the same time the pin 62 is carried to its right most position by the operating bars 33 and 34 and bears against the back side of the upper leg 25a of the release stanchion. The release stanchion is thereby held in its vertical position and is locked thereat. The cow, or cows accordingly, cannot get their necks or heads out of the space A and they are truly locked into position. This locking is achieved by virtue of the fact that the yoke 43a is firmly biased downwardly by the action of the spring member 61 as described, the physical abutment of the pin 62 bearing against the back surface of the release stanchion leg 25a, and the holding in position of the operating bars 33 and 34 by the action of the clevis member 36. In this position the cows are locked in and can be medically treated such as the drawing of blood, for example. As already pointed out the cows have self-caught themselves into position before the postion 3 can be assumed.

Moreover, the position of the release stanchion 25 as shown in FIG. 2, position 3, can be taken after all the cows have been released and have moved out of the stanchions. In other words, after all the cows have been released as described in connection with position 1 in FIG. 3, the operating bars can be moved toward their extreme right hand position, that is moved toward the position shown in FIG. 2 from the position shown in FIG. 3. In so doing the pin 62 bears against the rear surface of the leg 25a of the release stanchion and causes it to rotate clockwise toward its vertical position but as the upper end surface 85 is moved past the yoke member 43a it causes this member to pivot upwardly by virtue of the angular surface 85. As soon as this angular surface moves past the yoke 43a the yoke falls down under the influence of gravity and also under the actuation of the projection 58 and 59 to hold the yoke 43 down behind the rear surface of the release stanchion leg 25a. By virtue of the fact that the clevis member 36 holds the operating bars toward their right most positions also the release stanchion 25 is locked in the vertical position and cannot be moved until the operating bars are moved as already described. Thus in the position as shown in FIG. 2 there is either a complete lock-in position for all cows once they are there or a complete lock-out position if the cows are not there when the locking takes place. When the release stanchion is locked in the vertical position when there are no cows there, the position can be used for spreading of feed and so on when one does not want any interference by cows wandering around. It will be completely evident that the position of FIG. 2 is achieved by a single movement of the operating arm.

Figures 11, 12:
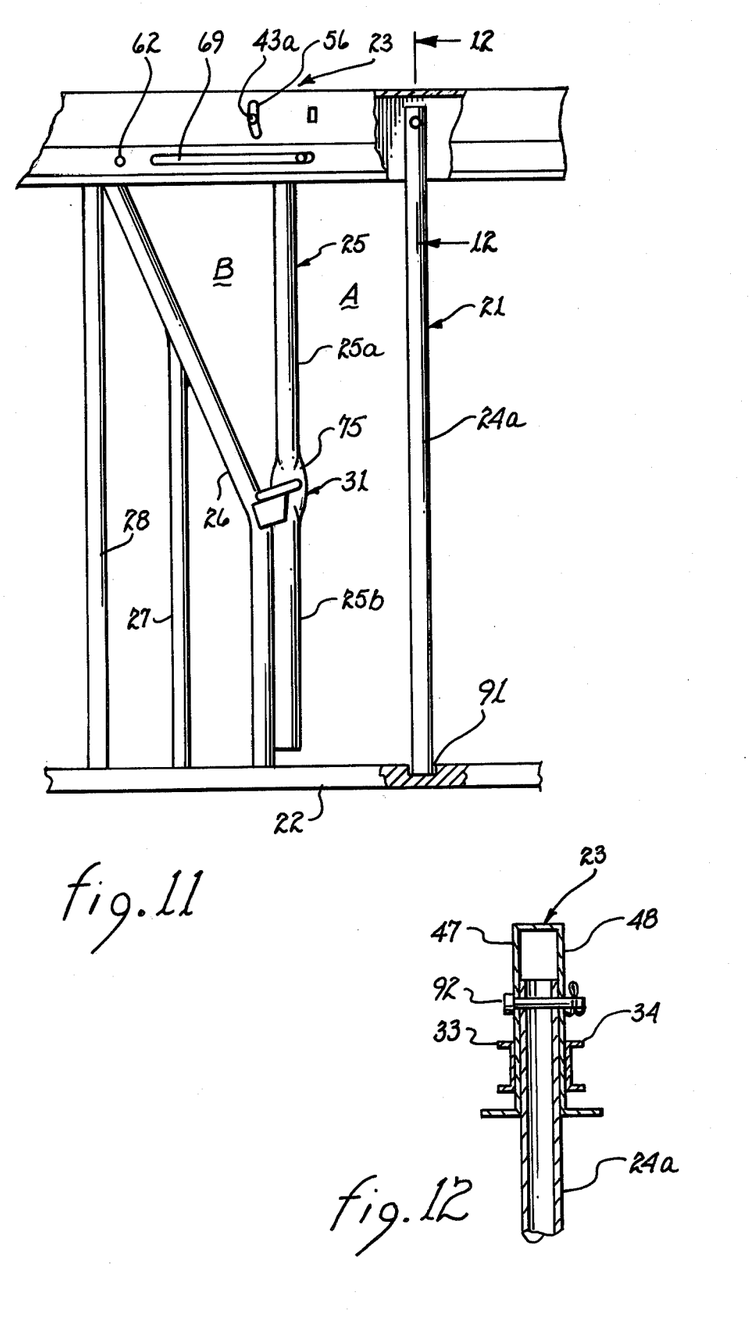
FIG. 11 is a fragmentary elevational view similar to FIG. 1 illustrating a further feature of the invention.
FIG. 12 is a sectional view taken substantially in the direction of arrows 12—12 of FIG. 11.

Referring to FIGS. 11 and 12 there is shown an arrangement whereby an individual cow can be released, removed, in the event that her head is jammed into the lower space against the lower portion 25a of the release stanchion. This situation can occur if a cow slips and falls with her head still in the space A between the fixed and release stanchions. When this occurs the release stanchion 25 remains fixed in position and does not, in fact cannot, pivot to the release position.

To remedy this emergency the fixed stanchion 24a is made releasable by disposing the lower end of the fixed stanchion loosely in an opening 91 and utilizing a removable pin 92 to hold the upper end of the fixed stanchion to the superstructure 23.

The pin 92 is received through holes in the members 47 and 48 of the superstructure and in the upper end of the fixed stanchion 24a. The location of holes and pin are such that the stanchion is firmly held in the base 22 and the superstructure 23. However when a cows head prevents the release stanchion 25 from opening, an attendant by removing the pin 92 can work the fixed stanchion 24a upwardly until the lower end thereof is moved out of the hole 91. At this point the lower end of the fixed stanchion moves sideways to enlarge the opening A and permits the cow to remove her head and go about her business.

Adjacent stanchions are not affected by the jamming of the stanchion at one station.

I claim:

1. A latching and release system for cattle stanchions comprising a fixed stanchion, first means for supporting said fixed stanchion at its upper end, second means for supporting said stanchion at its lower end, a release stanchion located adjacent said fixed stanchion to define a head opening for an animal, said release stanchion having an upper portion and a lower portion for actuating said release stanchion, said upper portion being adapted to be latched, mounting means attached at least to said first means mounting said release stanchion for pivotal movement between open and closed positions, said upper portion in said open position being pivoted away from said fixed stanchion to enlarge the upper part of said head opening and thereby enabling an animal to place its head through said head opening, said lower portion in said open position being located in said head opening for engagement by the neck of an animal with its head in said upper part of said head opening, said upper portion in said closed position being pivoted toward said fixed stanchion to narrow the upper part of said head opening, said lower portion being operative to pivot said release stanchion to said closed position upon movement of the animals neck against said lower portion and into the lower part of said head opening; latching means attached to said first means for releaseably engaging the upper end of said upper portion of said release stanchion in a closed position, actuating means attached to said first means for actuating said latching means to a release position for enabling release of said release stanchion, and operating mechanism movable relative to said first means for operating said actuating means between latching and release positions of said latching means, said latching means comprises a U-shaped member having two connected legs one of which is pivotally mounted in said first means and the other of which is movable downwardly under the force of gravity to a releasable stanchion latching position and upwardly to a release position, and said actuating means comprises and arm having an upper end attached to the pivotal leg of said U-shaped member and a depending lower end for engagement by said operating mechanism.

2. The latching and release system according to claim 1 wherein said arm comprises a leaf spring.

3. The latching and release system according to claim 1 wherein said operating mechanism comprises a reciprocating member engageable with the lower depending end of said arm for pivoting said U-shaped member between latching and release positions.

4. The latching and release system according to claim 3 wherein the upper end of said release stanchion comprises means for urging said U-shaped member to move into a position wherein gravity enables latching of the release stanchion to occur.

5. The latching and release system according to claim 3 wherein said reciprocating member is movable among three functional positions of a hold open position of said latching means, an automatic enable and individual release position of said latching means and a non-release position of said latching means.

6. The latching and release system according to claim 5 including intergaging means for holding said reciprocating member to said first means in each of said three positions.

7. The latching and release system according to claim 6 including a handle for reciprocating said reciprocating member relative to said first means.

8. The latching and release system according to claim 7 including a pin carried by said reciprocating member for engagement behind the upper end of said release stanchion in the non-release latching position of said latching means.

9. The latching and release system according to claim 1 including means for releasing said fixed stanchion from its support.

10. The latching and release system according to claim 9 wherein the means for releasing said fixed stanchion comprises a loose fitting support at the lower end of said fixed stanchion and a removable pin retaining member at the upper end of said fixed stanchion.

11. A latching and release system for cattle stanchions comprising a fixed stanchion having an upper end and a lower end, a release stanchion located adjacent said fixed stanchion to define a head opening for an animal, U-shaped means having two sides for receiving said upper end of said fixed stanchion between said two sides and for supporting same, means for supporting said lower end of said fixed stanchion, said release stanchion having an upper portion and a lower portion for actuating said release stanchion, said upper portion being adapted to be latched, mounting means having a lower end attached to said supporting means and having an upper end received between said two sides and attached to said U-shaped means mounting said release stanchion for pivotal movement between open and closed positions, said upper portion in said open position being pivoted away from said fixed stanchion to enlarge the upper part of said head opening and thereby enable an animal to place its head through said head opening, said lower portion in said open position being located in said head opening for engagement by the neck of an animal with its head in said upper part of said head opening, said lower portion being operative to pivot said release stanchion to said closed position upon movement by the animals neck against said lower portion and into the lower part of said head opening, latching means comprising a first pin extending between the two sides of said U-shaped means for releasably engaging the upper end of said upper portion of said release stanchion in a closed position, actuating means disposed between the two sides of said U-shaped means for actuating said latching means to a release position for enabling release of said release stanchion, and operating mechanism carried by said U-shaped means and being movable relative thereto for operating said actuating means between latching and release positions, said U-shaped means includes first arcuate slots and pivot openings in each of its two sides and said latching means comprises a U-shaped member having two connected legs one of which is pivotally mounted in said pivot openings and extends between the two sides of said U-shaped means and the other of which extends between said two sides in said first arcuate slots and is movable downwardly under the force of gravity to a releasable stanchion latching position and upwardly to a release position.

12. The latching and release system according to claim 11 wherein said pivot openings include parallel sides and said one connected leg includes parallel sides of less spacing than the parallel sides of said pivot openings.

13. The latching and release system according to claim 12 wherein said parallel sides comprise rectangles.

14. The latching and release system according to claim 11 wherein said U-shaped means includes second arcuate slots in each of its two sides, wherein said actuating means comprises an arm having an upper end attached to the pivot leg of said U-shaped member and a depending lower end having two ends projecting through said second arcuate slots for engagement by said operating mechanism and wherein said operating mechanism comprises reciprocating members movable alongside said two sides and each reciprocating member includes an elongated slot for receiving one of the said two projecting ends of said U-shaped member, said elongated slots having ends and dimensions for one end of said slots to engage said projecting ends for urging said other leg of said latching means to a non-release position of said latching means and for the other end of said slots to engage said projecting ends for urging said other leg of said latching means to a hold open position of said latching means.

15. The latching and release system according to claim 14 wherein the upper end of said release stanchion extends between said sides of said U-shaped means and comprises an angular surface for engaging said other leg of said U-shaped member to move same upwardly into a position wherein gravity enables latching of the release stanchion to occur, wherein each of said two sides of said U-shaped means includes a linear slot, and wherein a pin having ends projects through each of said linear slots and said pin ends project into said reciprocating members for movement thereby to engage behind the upper end of said release stanchion in said non-release latching position.

16. The latching and release system according to claim 15 including interengaging means for holding said reciprocating members to said first means in each of three functional positions, a hold open position of said latching means, an automatic latch and individual release position of said latching means, and a non-release latching position of said latching means.

17. The latching and release system according to claim 16 including a handle for reciprocating said reciprocating members relative to said first means.

18. The latching and release system according to claim 11 wherein the pivot for said release stanchion is offset from its center line for biasing said release stanchion toward its open position.

* * * * *